Nov. 5, 1963 R. V. BURNS 3,109,893

PROXIMITY OPERATED LOUDSPEAKING TELEPHONE

Filed Jan. 3, 1961

INVENTOR.
Robert V. Burns
BY
C. A. Gulbrandsen
Atty.

United States Patent Office 3,109,893

Patented Nov. 5, 1963

3,109,893

PROXIMITY OPERATED LOUDSPEAKING TELEPHONE

Robert V. Burns, Markham, Ill., assignor to Automatic Electric Laboratories, Inc., Northlake, Ill., a corporation of Delaware Filed Jan. 3, 1961, Ser. No. 80,259

9 Claims. (Cl. 179—1)

This invention relates to telephone communication systems and particularly to loudspeaking telephones that may be operated without the subscriber coming into physical contact with the telephone.

In many locations such as a bathroom or kitchen or in certain industrial locations it is often desirable to use a phone without coming into physical contact with it. By equipping a loudspeaking telephone with a proximity switch this desire may be achieved.

Most proximity switches contain an oscillator that is adjusted to the point where it will just oscillate. A sensing lead or plate is connected in such a manner that when an object approaches the sensing plate the oscillator is loaded more heavily and ceases to oscillate. Control circuitry is actuated by stopping the oscillations. Such an arrangement can never have long term stability due to the oscillator being just on the ragged edge of operation, any slight change in oscillator supply voltage, oscillator characteristics or other circuit components will cause the oscillator to go into full oscillation or die out completely.

Therefore it is the main object of this invention to provide a reliable arrangement which permits the user to turn the phone on, engage in a conversation and turn the phone off without coming into physical contact with the telephone.

A feature of the telephone of the instant invention is the inclusion of a highly stable proximity switch for turning the telephone on and off.

Another feature of this invention is the inclusion of a power supply for operation of a proximity switch that uses ordinary telephone ringing current as a source of potential.

A further feature of this invention is the inclusion of a proximity switch that is not effected by slight changes in supply voltage or variations or changes in other circuit components.

Still another feature is the inclusion in this invention of proximity switch circuitry that includes a capacitance bridge normally operating at the null point to guarantee long term stability.

Further objects and the attending advantages of the invention may be apparent from consideration of the following description taken in connection with the accompanying drawings, in which.

Figure 1:
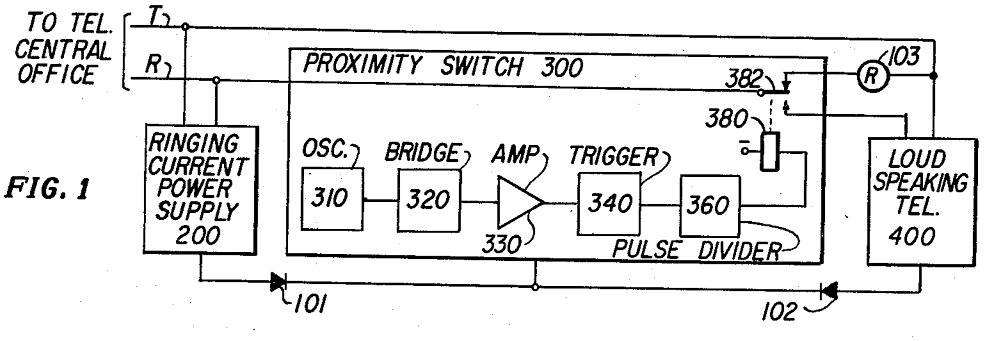
FIGURE 1 is a block diagram of a loudspeaking telephone arrangement that can be turned on or off by use of a proximity switch.

Referring to FIGURE 1 which shows in block diagram form a loudspeaking telephone arrangement in accordance with applicant's invention: When ringing current is extended from the central office over the line conductors to ringer 103 to signal the subscriber, this is also applied to ringing current power supply 200. Ringing current power supply 200 supplies the necessary D.C. potential for the actuation of proximity switch 300 through diode 101.

Upon hearing a ringing signal the subscriber passes a hand near a sensing plate which is part of bridge 320. This is sufficient to unbalance bridge 320 to cause a signal to appear at the output of bridge 320 and be amplified by amplifier 320. The amplified signal is applied to trigger circuit 340 which applies the necessary bias to pulse divider 360 causing pulse divider 360 to go into an operated state to supply the necessary operating potential to control relay 380. Operation of relay 380 disconnects ringer 103 and closes the line from the telephone central office through to the loudspeaking telephone. Conversation can now commence.

At the moment the loudspeaking telephone is connected to the line it applies operating battery to proximity switch 300 through diode 102 to maintain proximity switch 300 in its operated condition. When the telephone was answered by the subscriber at loudspeaking telephone 400, by placing his hand near the sensing plate of bridge 320, ringing from the central office ceased and as a result ringing current as a source for power supply 200 is no longer available. However because of the storage characteristics of ringing current power supply 200, adequate power is supplied from this source until power is available from the loudspeaking telephone 400.

At the completion of a telephone call the subscriber effects disconnection in a telephone line by again passing a hand near the sensing plate 321. The capacitance bridge 320 is again unbalanced conducting a signal from the oscillator 310 to amplifier 330 which extends a rectified D.C. signal to trigger 340. Operation of the trigger 340 causes pulse divider 350 to change states and hence deenergize control relay 380. As a result of this sequence of operations loudspeaking telephone 400 is disconnected from the telephone line, ringer 103 is reconnected to the line and since with the disconnection of loudspeaking telephone 400 operating power for proximity switch 300 is no longer available. The substation is now in condition to receive another incoming call.

Figure 2:
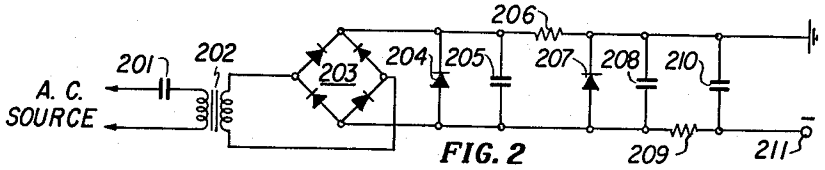
FIGURE 2 is a schematic diagram for a power supply operated from ringing current supplied from a telephone central office.

The D.C. power supply for proximity switch 300, operating from ringing current supplied over the telephone line is shown in FIGURE 2. The purpose of the power supply 200 is to maintain a source of constant D.C. voltage from the telephone line without seizing the line. This D.C. voltage must remain constant during the time ringing current is being supplied and also for a period after ringing has ceased. This extended period during which current must be supplied to the proximity switch 300 is in this embodiment no less than 6 seconds after ringing has ceased.

Ringing current is stepped down by transformer 202 and rectified by rectifier bridge 203. This rectified voltage is then applied to charge up capacitors 205, 208 and 210. Capacitor 201 prevents seizure of the telephone line by preventing completion of a D.C. loop. At the same time capacitor 205 stores the energy supplied during ringing. Capacitor 205 has a capacitance on the order of 4000 microfarads and as a consequence is able to supply the necessary operating potential after ringing current has ceased for a required period noted above. Capacitors 208 and 210 act to filter the output voltage of ringing current power supply 200. Diode 204 is a Zener diode which acts to limit the voltage across capacitor 205 to a value below the maximum rating of capacitor 205. Diode 207 is also a Zener diode and in combination with resistors 206 and 209 regulate the output voltage of the ringing current power supply 200.

Figure 3:
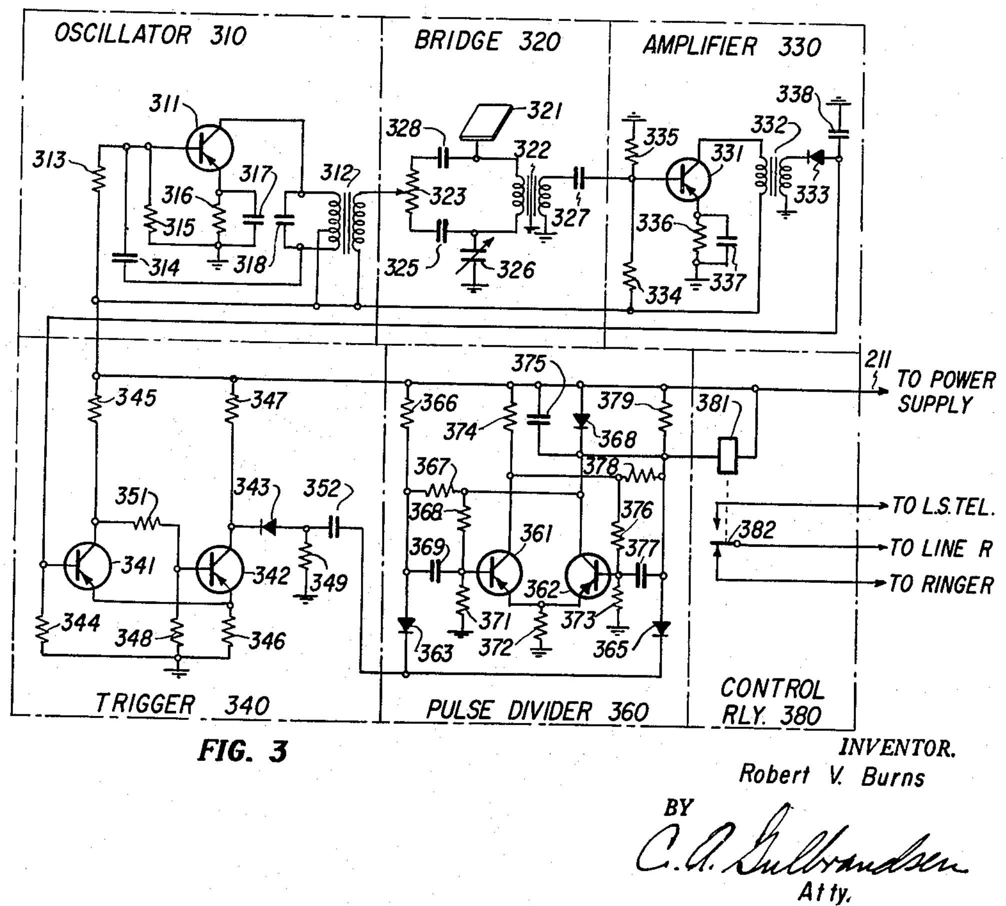
FIGURE 3 is a schematic circuit diagram of a proximity switch for use in a loudspeaking telephone arrangement.

A detailed schematic diagram of proximity switch 300 is shown in FIGURE 3. The embodiment shown in the proximity switch consists of oscillator 310. Oscillator 310 is a tickler coil feedback oscillator used to generate a low distortion sine wave possessing good frequency and amplitude stability. The resistors 313 and 315 provide base bias and in conjunction with resistance 316 D.C. stability.

Capacitor 314 couples feedback voltage to the base from the output tank circuit consisting of the primary of transformer 312 and its parallel capacitance 318. Capacitor 317 provides partial emitter bypassing to regulate the gain of transistor 311 to insure frequency stability. As noted above capacitor 318 and the primary of transformer 312 act to form a tank circuit which resonates in this case at a frequency of 32 kilocycles. The oscillator output voltage is stepped down at the secondary of transformer 312 and then extended to the next stage.

The next stage in the proximity switch is a capacitance bridge normally operating at the null point (zero output voltage). The bridge is made up of four capacitors, one capacitor in each leg. The first two legs have equal value capacitors 324 and 325, in the third leg a variable capacitor 316 and in the final leg metal sensing plate 321 which functions as one plate of the capacitor. Ground which is common to all circuits in the proximity switch forms the second plate, and air or any material between the sensing plate and ground form the dielectric of the capacitor in the final leg of capacitance bridge 320.

The capacitance of the fourth leg will increase when any object approaches sensing plate 321. If the object is an electrical conductor, the spacing between the sensing plate and the ground will be effectively decreased. If the object is an insulator the effective dielectric constant of the dielectric is increased. When the capacitance of the fourth leg is increased by the approach of any object, bridge 320 becomes unbalanced and produces a voltage across the primary of transformer 322. Transformer 322 contains an electrostatic shield between the primary and secondary windings. The output voltage from the bridge is stepped down at the secondary of transformer 322 and sent through coupling capacitor 327 to the next stage. Potentiometer 323 and variable capacitor 316 are used to adjust the bridge for a null.

The output voltage from bridge 320 is coupled to amplifier 330. This amplifier is a high gain tuned amplifier tuned for maximum gained at the operating frequency of oscillator 310. Resistances 334 and 335 provide base bias and in conjunction with resistance 336 D.C. stability. The emitter is bypassed by capacitor 337 to prevent A.C. degeneration. Transformer 332 couples the output of amplifier 330 to the next stage. However this output voltage from the secondary of transformer 332 is rectified by diode 333 and filtered by capacitor 338 to remove the sine wave component and retain the negative D.C. components. The negative D.C. voltage from diode 333 is fed to the trigger threshold in the succeeding stage.

Trigger 340 is a monostable multivibrator having one steady state and requiring a minimum, critical negative voltage for triggering. With no voltage at the base of transistor 341, 341 will be in cutoff and transistor 342 in saturation. When the voltage at the base of transistor 341 reaches a critical value (in this case .75 volt), transistor 341 will conduct and send transistor 342 into cutoff. Transistor 342 will remain in cutoff until the voltage at the base of transistor 341 falls below the critical value (.7 volt), then transistor 342 will return to saturation.

Included in the output of trigger 340 are a recycle delay circuit consisting of diode 343 and capacitor 352. These elements provide a time delay that prevents turning off the telephone within one second after it has been turned on. Also turning on the telephone within one second after it has been turned off. When diode 333 has an output voltage and transistor 342 goes into cutoff the collector of transistor 342 rises to battery potential, this rise in voltage causes diode 343 to conduct, while 342 conducting applies a negative voltage at the input to the following stage. Capacitor 352 will soon charge and removes the input voltage to the input of the following stage. When transistor 342 returns to saturation, diode 343 will be reverse biased and capacitor 352 will begin discharging through resistor 349. Should transistor 342 go into cutoff before capacitor 352 has discharged the changed voltage on capacitor 315 will subtract from the battery voltage and the input pulse will be too low an amplitude to trigger the following stage, capacitor 352 will again recharge and a full one second waiting time will again be required before the pulse can be triggered. This delay time may be made longer by increasing the value of resistance 349 or shorter by decreasing the value of resistance 349.

The pulse divider 360 is a bistable multivibrator having two steady states. Transistor 361 in saturation and transistor 362 in cutoff, or transistor 361 in cutoff and transistor 362 in saturation. A negative pulse supplied from the preceding stage to resistance 352 will cause the pulse divider to change states, and remain that way until another negative pulse arrives. When transistor 362 is in saturation current flows through coil 381 in control relay circuit 380 to operate contacts 382 to complete the loop to the loudspeaking telephone to turn it on. When battery is first applied to the proximity switch 300, capacitor 375 holds transistor 361 in saturation until capacitor 375 charges, at the end of this time transistor 361 will remain in saturation until the arrival of an input pulse from trigger 340. Diode 364 is used for spark suppression across control relay 380.

What is claimed is:

1. In a telephone system, a central office, a subscriber station, a telephone line extending between said central office and said subscriber station, said central office including means operated to signal a subscriber by transmitting ringing current over said telephone line to said subscriber station, said subscriber station including a loudspeaking telephone, signal receiving means connected to said line, and switching means comprising: a proximity switch connected to said telephone line at said subscriber station conditioned in response to the receipt of ringing current from said central office over said telephone line, and operated after conditioning in response to a subscriber introducing an object near said proximity switch to disconnect said signal receiving means from said line and connect said loudspeaking telephone to said line; said proximity switch including an oscillator, a capacitance switch connected to said oscillator, an amplifier connected to said capacitance bridge, trigger means connected to said amplifier, and switching means connected to said trigger means, operated in response to operation of said trigger means, said trigger means operated in response to an amplified signal from said capacitance bridge when said object is introduced in proximity to said capacitance bridge, introduction of said object near said capacitance bridge unbalancing said bridge to conduct a signal from said oscillator.

2. In a telephone system, a central office, a subscriber station, a telephone line extending between said central office and said subscriber station, said central office including means operated to signal a subscriber by transmitting ringing current over said telephone line to said subscriber station, said subscriber station including a loudspeaking telephone, signal receiving means connected to said line, and switching means comprising: a proximity switch connected to said telephone line at said subscriber station conditioned in response to the receipt of ringing current from said central office over said telephone line, and operated after conditioning in response to a subscriber introducing an object near said proximity switch to disconnect said signal receiving means from said line and connect said loudspeaking telephone to said line; a proximity switch including, frequency stabilizing means, an amplifier including output rectification means, a capacitance bridge including a sensing plate and null adjustment means coupling said oscillator to said amplifier, switching means including loudspeaking telephone connecting means and signal receiving disconnect means, and trigger means including a reset delay network operated from a rectified output of said amplifier to operate said switching means, said trigger means operated upon introduction of said object in proximity to said sensing plate unbalancing said capacitance bridge to extend the output of said oscillator to said amplifier to operate said trigger.

3. In a telephone system, a central office, a subscriber station, a telephone line extending between said central office and said subscriber station, said central office including means operated to signal a subscriber by transmitting ringing current over said telephone line to said subscriber station, said subscriber station including a loudspeaking telephone, signal receiving means connected to said line and switching means comprising: a proximity switch connected to said telephone line at said subscriber station conditioned in response to the receipt of ringing current from said central office over said telephone line, and operated after conditioning in response to a subscriber introducing an object near said proximity switch to disconnect said signal receiving means from said line and connect said loudspeaking telephone to said line; said proximity switch comprising, an oscillator, an amplifier including signal rectification means, a bridge circuit having four arms, each arm including a capacitance element, one of said capacitance elements including a sensing plate, said bridge circuit connected between said oscillator and said amplifier operated in response to introduction of said object near said sensing plate to couple signals from said oscillator to said amplifier, a trigger circuit, a control relay including switching means normally connecting said signal receiving means to said telephone line, a pulse divider connected between said trigger circuit and said control relay, said trigger circuit connected to said amplifier operated in response to rectified signals from said amplifier to operate said pulse divider to energize said control relay, said relay on energization operating said switching means to disconnect said signal receiving means from said telephone line and connect said loudspeaking telephone to said line.

4. In a telephone system a central office; a telephone line extending from said telephone office, said central office including means operated to transmit ringing current over said line; a subscriber station terminating said line including signal receiving means connected to said line, a loudspeaking telephone and switching means comprising: a power supply connected to said telephone line; a proximity switch connected to said power supply and to said line; said power supply operated in response to receipt of ringing current over said telephone line from said central office to apply power to said proximity switch, conditioning said proximity switch for operation; said proximity switch operated after conditioning in response to a subscriber momentarily introducing an object near said proximity switch to disconnect said signal receiving means from said line and connect said loudspeaking telephone to said line; said power supply including, direct current isolation means connecting said power supply to said telephone line, rectification means connected to said telephone line whereby said ringing current transmitted from said central office over said telephone line is converted to direct current, and current storage means included in the connection between said power supply and said proximity switch whereby current for operation of said proximity switch may be stored and then transmitted to said proximity switch after termination of the transmission of ringing current from said central office.

5. In a telephone system a central office; a telephone line extending from said central office; said central office including means operated to transmit ringing current over said telephone line; a subscriber station terminating said line including signal receiving means connected to said line, a loudspeaking telephone and switching means comprising: a power supply connected to said telephone line; a proximity switch connected to said power supply and to said line; said power supply operated in response to receipt of ringing current over said telephone line from said central office to apply power to said proximity switch conditioning said proximity switch for operation; said proximity switch operated after conditioning in response to a subscriber momentarily introducing an object near said proximity switch to disconnect said signal receiving means from said line and connect said loudspeaking telephone to said line; said power supply including; regulation means included in said connection between said power supply and said proximity switch effective when said power supply is operated to regulate the power supplied to said proximity switch, said power supply further including means for filtering current supplied to said proximity switch, current limiting means included in said connection between said power supply and said proximity switch limiting the amount of current drawn by said proximity switch, and voltage reduction means included in said connection between said power supply and said telephone line whereby the voltage of said ringing current transmitted from said central office is reduced for conditioning said proximity switch.

6. In a telephone system including a central office, a subscriber substation and a telephone line extending between said central office and said substation; said substation including: signal receiving means connected to said telephone line operated in response to the application of ringing current to said telephone line at said central office to signal the subscriber; a loudspeaking telephone; a proximity switch comprising an oscillator, a trigger circuit, a capacitance bridge coupling said oscillator to said trigger circuit operated in response to the introduction of an object adjacent to said bridge to extend signals from said oscillator to said trigger circuit; switching means connected to said trigger circuit; said trigger circuit in response to the extension of signal from said oscillator operated to actuate said switching means, said switching means on actuation disconnecting said signal receiving means from said telephone line and connecting said loudspeaking telephone to said line.

7. A proximity switch for controlling an external circuit comprising: a signal generator; an amplifier; a capacitance bridge including a sensing element connected between said signal generator and said amplifier; circuit switching means connected to the external circuit and said amplifier; said capacitance bridge in response to the introduction of an object adjacent to said sensing element conducting signals from said signal generator to said amplifier, said amplifier operated in response to the extension of said signals to extend said signals to said switching means to operate said switching means to control the external circuit.

8. A proximity switch for controlling an external circuit comprising: a signal generator including an oscillator and frequency stabilizing means; an amplifier including rectified output means; a capacitance bridge including a sensing element and bridge balancing means connected between said signal generator and said amplifier; circuit switching means connected to the rectified output means of said amplifier and in response to introduction of an object adjacent to said sensing element of said capacitance bridge conducting signals from said generator to said amplifier, said amplifier in response to the presence of said signals extending a rectified signal from its output to said switching means; said switching means operated in response to said rectified signal.

9. A proximity switch for controlling an external circuit comprising: an oscillator; an amplifier; a capacitance bridge connected between said oscillator and said amplifier; switching means; and trigger means connected between said amplifier and said switching means, said capacitance bridge unbalanced by introduction of an adjacent object to conduct signals from said oscillator to said amplifier; said amplifier further extending said signals to said trigger means; said trigger means energized by said extension of signals to operate said switching means to control the external circuit.

References Cited in the file of this patent

UNITED STATES PATENTS

| | | |
|---|---|---|
| 2,490,238 | Simons | Dec. 6, 1949 |
| 2,691,130 | Ingersoll | Oct. 5, 1954 |
| 2,810,066 | Green | Oct. 15, 1957 |
| 2,826,636 | Beatty | Mar. 11, 1958 |
| 2,844,659 | Shaw | July 22, 1958 |
| 2,928,081 | Grosso | Mar. 8, 1960 |

FOREIGN PATENTS

| | | |
|---|---|---|
| 1,049,743 | Germany | Jan. 29, 1959 |

OTHER REFERENCES

"Telephony," February 1, 1958, page 21.